(12) United States Patent
Wackerly et al.

(10) Patent No.: US 10,601,701 B2
(45) Date of Patent: Mar. 24, 2020

(54) MINIMIZATION OF NETWORK DOWNTIME

(71) Applicant: HEWLETT PACKARD ENTERPRISE DEVELOPMENT LP, Houston, TX (US)

(72) Inventors: Shaun Wackerly, London, KY (US); Charles F. Clark, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/996,391

(22) Filed: Jun. 1, 2018

(65) Prior Publication Data
US 2019/0372884 A1    Dec. 5, 2019

(51) Int. Cl.
*H04W 24/08* (2009.01)
*H04L 12/727* (2013.01)
*H04L 12/947* (2013.01)

(52) U.S. Cl.
CPC ............ *H04L 45/121* (2013.01); *H04L 49/25* (2013.01); *H04W 24/08* (2013.01)

(58) Field of Classification Search
CPC ....... H04L 45/121; H04L 49/25; H04W 24/08
See application file for complete search history.

(56) References Cited

U.S. PATENT DOCUMENTS

| | | | |
|---|---|---|---|
| 7,975,187 B2 | 7/2011 | Kogan et al. | |
| 2003/0187967 A1 | 10/2003 | Walsh et al. | |
| 2012/0163177 A1* | 6/2012 | Vaswani | H04L 45/00 370/236 |
| 2013/0232382 A1* | 9/2013 | Jain | H04L 41/069 714/48 |
| 2014/0136690 A1* | 5/2014 | Jain | H04L 41/5012 709/224 |
| 2016/0072664 A1* | 3/2016 | Lindem, III | H04L 41/0663 370/219 |
| 2017/0180256 A1* | 6/2017 | Kamath | H04L 47/125 |

OTHER PUBLICATIONS

Canary Communications, Managed 6-Port 10/100BASE-TX/ FX Multi-Media Switch, (Web Page), Retrieved Feb. 28, 2018, 2 Pgs., http://canarycom.com/products/cmx4021_4022/p1.htm.
Prevent Network Downtime to Prevent Costly Outages, (Web Page), Retrieved Feb. 28, 2018, 4 Pgs., http://www.prescientsolutions.com/blog/preventnetworkdowntimepreventcostlyoutages.
Vayl, A., Best-practice Takeaways from Internet Outages, (Web Page), Mar. 27, 2017, 7 Pgs., http://www.informationage.com/bestpracticetakeawaysinternetoutages123465275/.

* cited by examiner

*Primary Examiner* — Lakeram Jangbahadur
(74) *Attorney, Agent, or Firm* — McDermott Will & Emery

(57) ABSTRACT

Methods for systems are provided. In one aspect, a method for minimizing a network outage includes identifying one or more paths connecting a resource node of the network to an edge switch of one or more edge switches of the network. Each edge switch is connected to one or more endpoint devices to allow resources coupled to the resource node to be provided to the one or more endpoint devices. The method further includes calculating endpoint downtime costs corresponding to rebooting each of the common switches in the network. The common switches are present in all paths connecting the resource node to the edge switch. The calculated endpoint downtime costs corresponding to the one or more common switches are compared. One of the common switches with a highest endpoint downtime cost is identified as a candidate switch for redundancy based on the comparison.

20 Claims, 13 Drawing Sheets

MINIMIZATION OF NETWORK DOWNTIME

TECHNICAL FIELD

The present disclosure generally relates to communication networks, and more specifically relates to minimizing network upgrade downtime.

BACKGROUND

Communication networks typically include a number of switches that are operable to connect various resources available on the network to endpoint devices. In many switches, a firmware defect or upgrade can affect connectivity of these endpoint devices. This can occur either because services provided by the switch may be restarted internally, or because the switch itself is rebooted entirely. When a network encounters issues or requires an upgrade, often endpoint devices experience outages, which are mainly due to a lack of redundancy in the network. For example, before performing a network upgrade, the administrator often has to analyze the network to determine where the upgrade can result in an outage. In the best case, the network is fully redundant and each switch can be upgraded without impacting endpoints. In the worst case, there is no redundancy in the network and the entire network has to be upgraded in a single outage window that affects all endpoints.

An existing solution estimates the downtime and cost of downtime in an information technology network by using a model tree to simulate the network. Each element is assigned a workload, and a cost of downtime caused by element failures is determined by multiplying an amount of workload that is lost from the simulated element failures by the cost per unit workload. Another existing method determines the impact of failures in a data center network by identifying failures for the data center network based on data about the data center network, and grouping the failures into failure event groups including related failures for a network element. The method also estimates the impact of the failures for each of the failure event groups by correlating the failures with traffic for the data center network.

The description provided in the background section should not be assumed to be prior art merely because it is mentioned in or associated with the background section. The background section may include information that describes one or more aspects of the subject technology

SUMMARY

The disclosed methods and systems provide for minimizing network upgrade downtime. The subject technology achieves this result by, for example, by identifying areas of a network that are vulnerable to outage due to a failure or upgrade in the network infrastructure. The disclosed solution further solves the problem of ordering a sequence of upgrades to minimize downtime in non-redundant areas of the network.

According to certain aspects of the present disclosure, a system is provided for minimizing a network outage. The system includes a memory and a processor. The memory stores instructions, and the processor can execute the instructions. The instructions include identifying one or more paths connecting a resource node of the network to an edge switch of one or more edge switches of the network. Each edge switch is connected to one or more endpoint devices to allow resources coupled to the resource node to be provided to the endpoint devices. The instructions further include determining one or more common switches among the identified paths connecting the resource node of the network to the edge switch. The instructions further include calculating endpoint downtime costs corresponding to rebooting each switch, comparing the calculated endpoint downtime costs corresponding to the common switches and identifying a candidate switch for redundancy by determining, based on the comparison, a switch having a highest endpoint downtime cost as the candidate switch for redundancy.

According to certain aspects of the present disclosure, a method is provided for minimizing a network outage. The method includes identifying one or more paths connecting a resource node of the network to an edge switch of one or more edge switches of the network. Each edge switch is connected to one or more endpoint devices to allow resources coupled to the resource node to be provided to the one or more endpoint devices. The method further includes calculating endpoint downtime costs corresponding to rebooting each of the common switches in the network. The common switches are present in all paths connecting the resource node to the edge switch. The calculated endpoint downtime costs corresponding to the one or more common switches are compared. One of the common switches with a highest endpoint downtime cost is identified as a candidate switch for redundancy based on the comparison.

According to certain aspects of the present disclosure, a non-transitory machine-readable media is provided. The non-transitory machine-readable storage medium includes machine-readable instructions for causing a processor to execute a method. The machine-readable instructions include identifying one or more paths connecting a resource node of the network to an edge switch. Each edge switch is connected to one or more endpoint devices to allow resources coupled to the resource node being provided to the one or more endpoint devices. The machine-readable instructions further include calculating endpoint downtime costs corresponding to rebooting each switch of one or more common switches that are present in all paths connecting the resource node to the edge switch. The machine-readable instructions further include comparing the calculated endpoint downtime costs corresponding to the common switches, and identifying a common switch with a highest endpoint downtime cost as a candidate switch for redundancy based on the comparison of the calculated endpoint downtime costs.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1B:
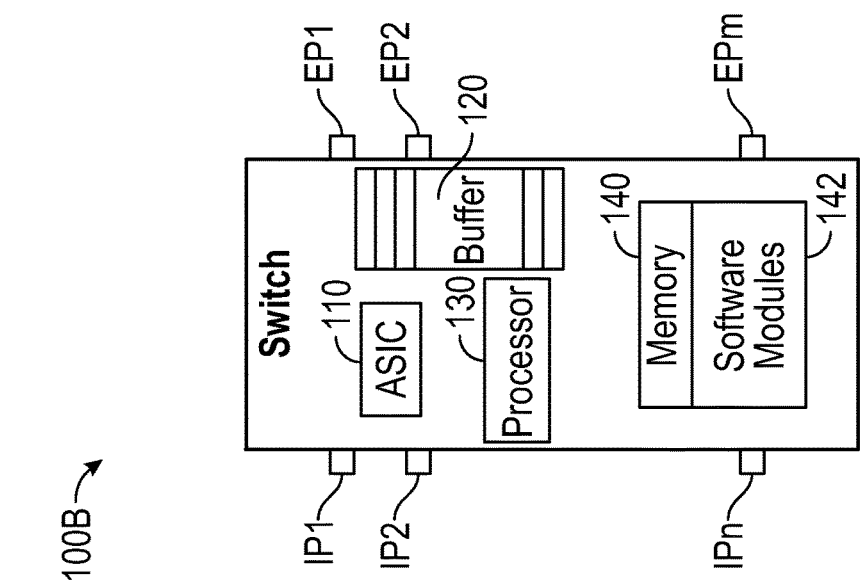
FIG. 1B is a diagram illustrating an example switch used by the subject technology.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In the disclosure herein, a term "visible network" refers to a set of known switches (and their inter-connections), the information of which are available and typically defines the domain of responsibility for a network administrator. A term "switch" refers to a network node, the primary purpose of which is to forward packets from one port to another. A term "endpoint" refers to a network node, the primary purpose of which is to send traffic from itself and receive traffic to itself. A term "edge switch" refers to a switch which is connected to at least one network node which is not a switch (e.g., an endpoint). A logical entity formed by multiple physical switches (such as a stack) is considered a single switch. A term "critical resource" refers to a network entity that provides critical services to one or more endpoint devices and/or users, upon which the endpoint devices are dependent for providing their basic services. The resource can be a server, a gateway, etc. The critical resource is the reference point from which the network redundancy is calculated. A term "downtime" refers to a lack of connectivity to the critical resource.

General Overview

The subject technology is directed to methods and configurations for minimizing a network outage as a result of upgrading the network, for example, by rebooting one or more switches of the network. The disclosed solution analyzes the topology of the network in real-time to identify vulnerable areas of the network and recommends an effective supplementation. For example, the subject system can recommend switch upgrades or automate switch upgrades to minimize downtime for endpoint devices of the network.

In one or more implementations, the disclosed method includes identifying one or more paths that connect a resource node of the network to an edge switch of the network, which is directly connected to one or more endpoint devices. The method calculates endpoint downtime cost corresponding to each switch of one or more common switches among the identified paths. The calculated endpoint downtime costs corresponding to the common switches are compared to identify a switch with a highest endpoint downtime cost as a candidate switch for redundancy. In some implementations, the identified paths are converted to corresponding bitmaps that are stored in a database. In some implementations, a bitmap can contain a representation of all switches that exist in a respective path, regardless of an order of those switches in the path. Such a bitmap is referred to as a path order independent bitmap. In one or more implementations, a candidate link for redundancy is identified based on link reliability. The candidate link connects the candidate switch for redundancy to another switch of the common switches. In some implementations, a reboot order is determined among a set of switches which can be rebooted together in order to minimize the downtime of the network.

The disclosed solution includes a number of advantageous features. For example, the subject technology can efficiently identify endpoint devices that are vulnerable to an outage due to an upstream switch reboot, can identify redundancy issues which could be resolved by a configuration change, recommends areas of the network to add redundancy based on user count, cost, duration, and other factors. The advantages of the subject technology further includes making recommendations for both switches and links and producing an ordered sequence by which switches should be upgraded to minimize downtime, along with the time of day that sequence should be executed.

Example System Architecture

Figure 1A:
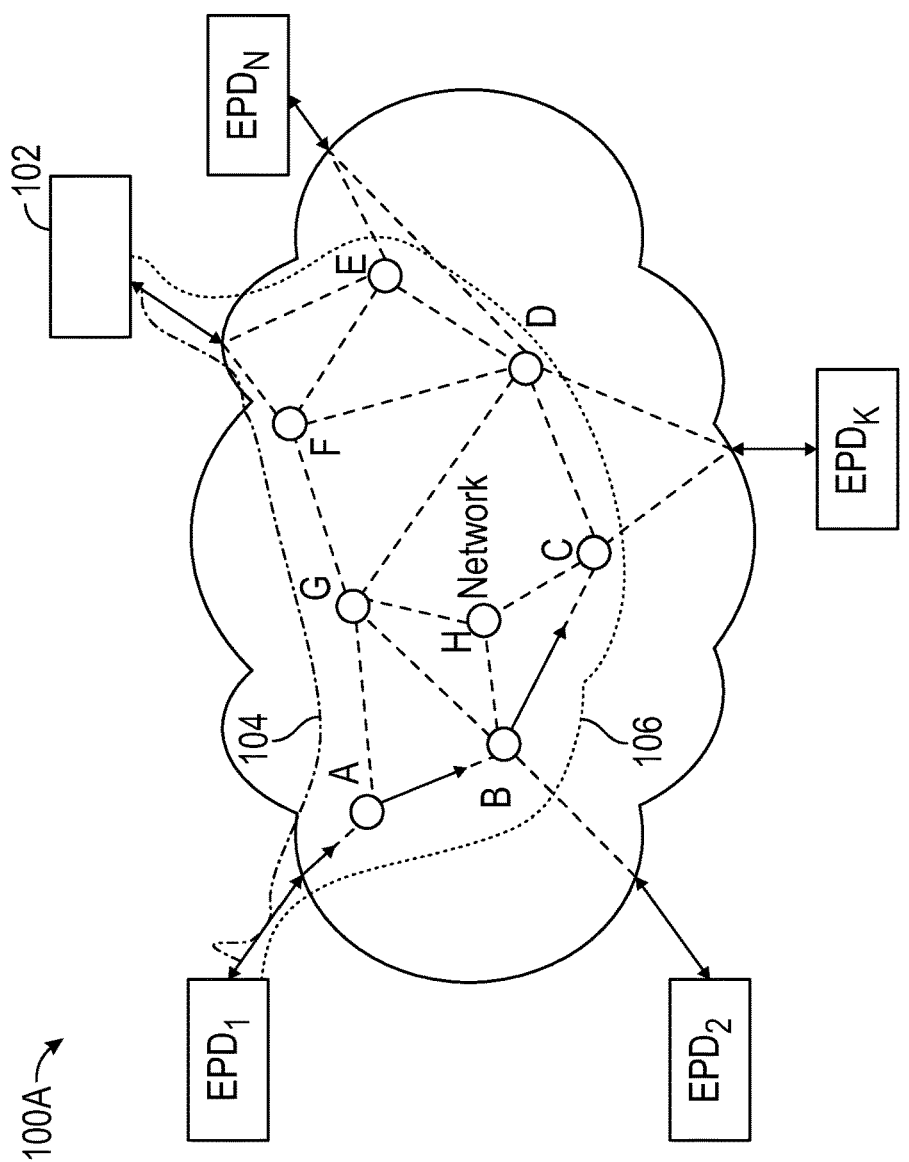
FIG. 1A is a diagram illustrating an example architecture for a network environment in which the subject technology is implemented.

FIG. 1A is a diagram illustrating an example architecture for a network 100A, in which the subject technology is implemented. Examples of the network 100A may include a private network including a virtual local-area network (VLAN) such as a data-center network, an enterprise network, or other private networks. The network 100A is a visible network and includes a number of devices (e.g., nodes) such as multiple switches (e.g., A, B, C, D, E, F, G and H), a number of endpoint devices (e.g., $EPD_1$, $EPD_2$ . . . $EPD_N$) and one or more resource nodes 102. The resource node 102 may be a server that is part of the network 100A and provides services to one or more of the endpoint devices. In some implementations, the resource node 102 is a gateway and provides connectivity to one or more other networks. In the example network 100A, the resource node 102 is connected to different endpoint devices via paths that pass through various switches. For example, the resource node 102 can be connected to the endpoint device $EPD_1$ through a number of paths. Examples of these paths include a path 104 (102-F-G-A-EPD1) or a path 106 (102-E-D-C-B-A-EPD1). Other paths can also be identified that can connect the resource node 102 to the endpoint device $EPD_1$. In the example network 100A, switches A, B, C, D and E are edge switches, as they are directly connected to endpoint devices $EPD_1$, $EPD_2$, $EPD_K$ and $EDP_N$.

FIG. 1B illustrates an example architecture of a switch 100B (e.g., $SW_1$, $SW_2$ ... $SW_M$) of the network 100A. The switch 100B includes multiple ingress (input) ports IP1-IPn and multiple egress (output) ports EP1-EPm. In one or more implementations, one or more of the ingress ports IP1-IPn can receive a data packet from another switch or and endpoint device of the network. In one or more implementations, a physical port can act as both an ingress and egress port simultaneously. The switch 100B further includes a hardware component such as an application specific integrated circuit (ASIC) 110 (which in some embodiments can be implemented as a field-programmable logic array (FPGA)), a buffer 120, a processor 130, memory 140, and software module 142.

In some implementations, the ASIC 110 can include suitable logic, circuitry, interfaces and/or code that can be operable to perform functionalities of a PHY circuit. The buffer 120 includes suitable logic, circuitry, code and/or interfaces that are operable to receive and store and/or delay a block of data for communication through one or more of the egress ports EP1-EPm. The processor 130 includes suitable logic, circuitry, and/or code that can enable processing data and/or controlling operations of the switch 100B. In this regard, the processor 130 can be enabled to provide control signals to various other portions of the switch 100B. The processor 130 also controls transfers of data between various portions of the switch 100B. Additionally, the processor 130 can enable implementation of an operating system or otherwise execute code to manage operations of the switch 100B.

The memory 140 includes suitable logic, circuitry, and/or code that can enable storage of various types of information such as received data, generated data, code, and/or configuration information. The memory 140 includes, for example, RAM, ROM, flash, and/or magnetic storage. In various embodiment of the subject technology, the memory 140 may include a RAM, DRAM, SRAM, T-RAM, Z-RAM, TTRAM, or any other storage media. The memory 140 can include software modules 142 that when executed by a processor (e.g., processor 130) can perform some or all of the functionalities that are not present in the ASIC 110. In some implementations, the software modules 142 include codes that when executed by a processor can perform functionalities such as configuration of the switch 100B.

Figure 2A:
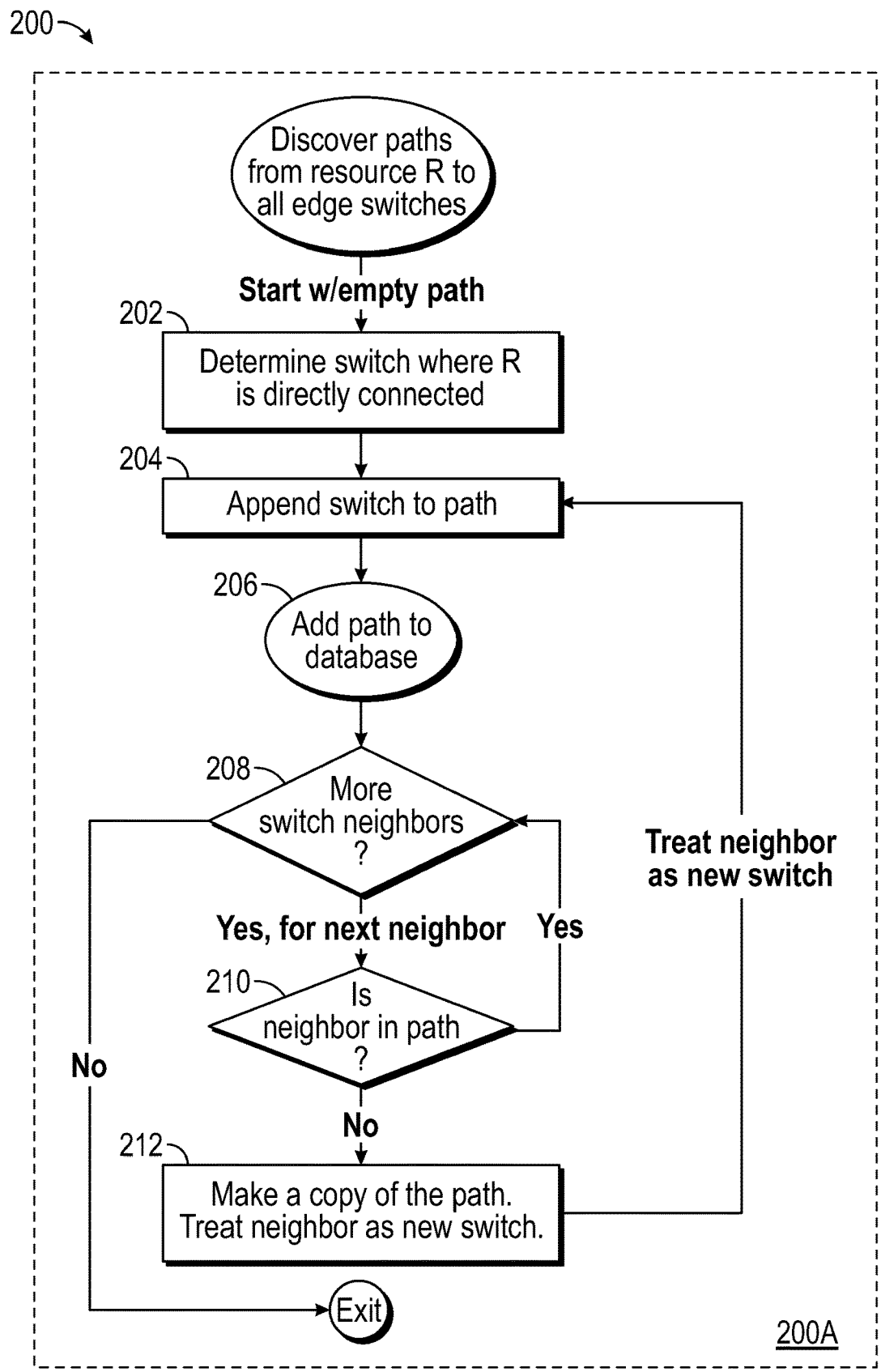
FIGS. 2A-2B are flow diagrams illustrating an example process for determining paths from a resource node to an edge switch of a network according to certain aspects of the disclosure.
Figure 2B:
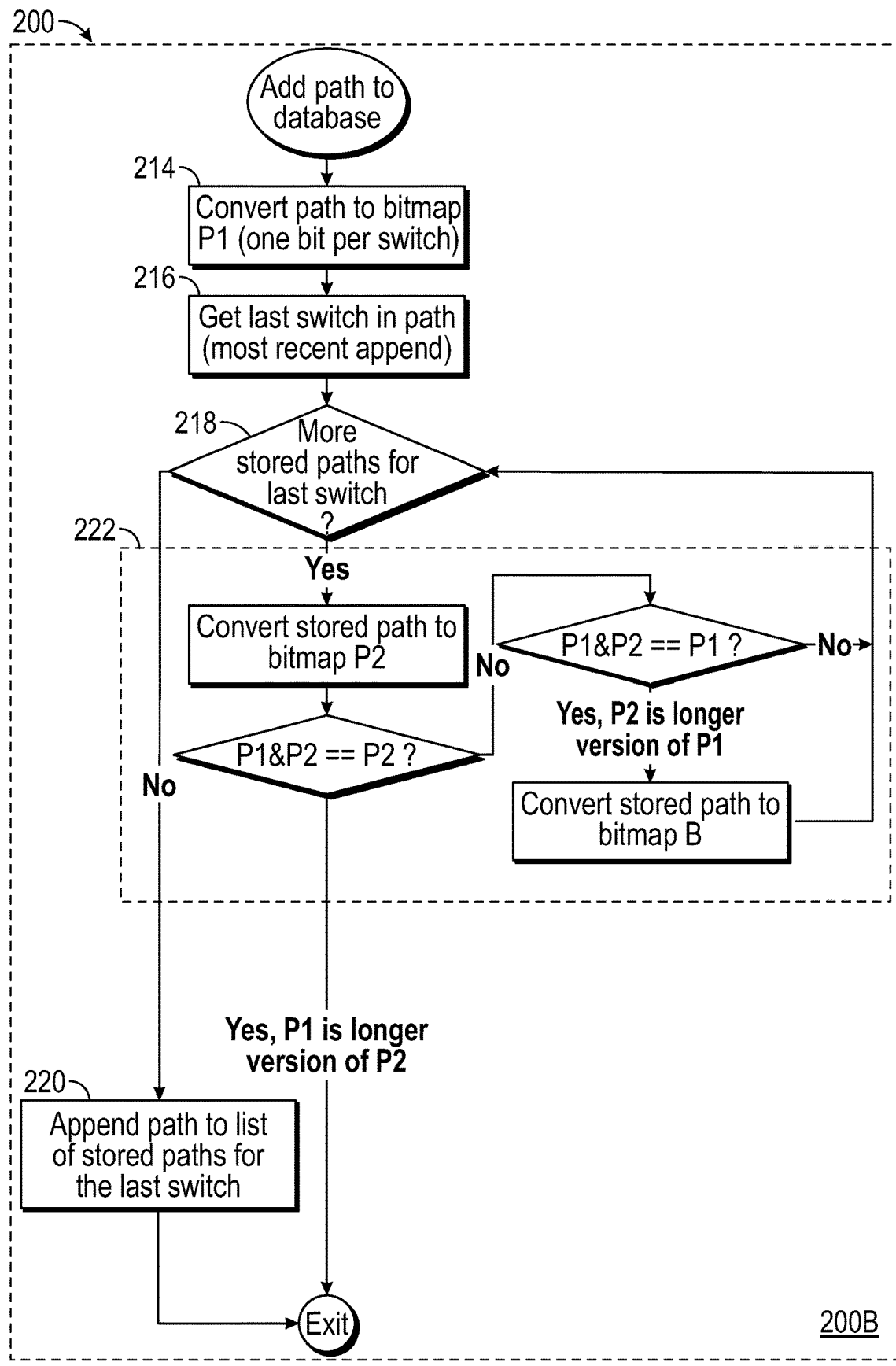

FIGS. 2A-2B are flow diagrams illustrating an example process 200 for determining paths from a resource node to an edge switch of a network according to certain aspects of the disclosure. The example process 200 includes process flows 200A and 200B, which are respectively responsible for discovering paths from a resource node 102 of FIG. 1A to all edge switches (e.g., A, B, C, D, E, F, G and H of FIG. 1A) and adding the identified paths to a database.

The process flow 200A starts at a switch that is directly connected to resource R and explores all possible paths from R to any edge switch. The process flow 200A may use a standard brute-force search algorithm to find all paths and may ignore any path that visits the same switch twice. By skipping paths where the same switch is used twice, it is ensured that the process does not iterate indefinitely. The process flow 200A begins at operation block 202, where one or more switches that are directly connected to the resource node 102 are identified. The identified switches are appended, at operation block 204, to a path (e.g., 104 of FIG. 1A) that is empty at the beginning of the process flow 200A. At operation block 206, the path is added to a database, if the most recent added switch is an edge switch. At a control block 208, it is checked whether there are more neighboring switches to the most recently added switch. If there are no more neighboring switches to the most recently added switch, the process flow 200A ends. Otherwise, if there are more neighboring switches to the most recently added switch, at operation block 210, it is checked whether the neighboring switches are in the path. If the neighboring switch is in the path, the control is passed to control block 208. Otherwise, if the neighboring switch is not in the path, at operation block 212, a copy of the path is made and the control is passed to operation block 204.

TABLE 1

| Switch | Index | Bit Mask |
|---|---|---|
| A | 0 | 1xxxxxxx |
| B | 1 | x1xxxxxx |
| C | 2 | xx1xxxxx |
| D | 3 | xxx1xxxx |
| E | 4 | xxxx1xxx |
| F | 5 | xxxxx1xx |
| G | 6 | xxxxxx1x |
| H | 7 | Xxxxxxx1 |

Table 1 shows a switch set including switches A through H indexed from 0 to 7, and corresponding bit masks, as discussed herein. The process flow 200B is a more detailed form of the process flow 206 and begins at operation block 214, where the ordered path is converted to an order-independent bitmap P1. In this operation block, each switch in the network is given a unique incremental bit position within the bitmap, so that the total number of bits in the bitmap equals the total number of switches (e.g., A through H in the switch set of Table 1) in the network. It is noted that using the example switch set of Table 1, the bitmap for paths A-B-D-F and A-D-B-F would be the same (1101010) in binary. The bitmap for a path in binary can be generated by performing a bitwise OR of the respective bit masks of the switches in that path. This indicates that the bitmap for the path is order-independent.

At operation block 216, the last switch (e.g. most recent switch) added to the path is identified. At control block 218, it is checked whether there are more stored paths in the database that include the last switch. If there are no more stored paths in the database, at operation block 220, the path (e.g., 104) is stored in a list of paths for the last switch and the process ends. Otherwise, if there are more stored paths in the database a number of optional process steps shown in the block 222 are performed. The steps of the block 222 are to ensure that only the shortest path using a given set of nodes is stored. For instance, if the path A-B-D-E-F-G (binary: 1101111) is the already stored path P1, and an attempt is made to store a path P2: A-B-F-G (binary: 1100011), the process steps of block 222 compare the binary for paths P1 and P2. The comparison is performed by analyzing the statement 'P1 & P2==P2' and 'P1 & P2==P1'. If the statement 'P1 & P2==P2' (e.g., comparison (1100011 & 1101111) computes to false, but the statement 'P1 & P2==P1' computes to true, it can be concluded that the stored path P1 (A-B-D-E-F-G) is a longer version of the path P2 (A-B-F-G). Thus the block 222 can, for example, replace the path P1 (A-B-D-E-F-G) with the shorter path P2 (A-B-F-G) in the database. The result of the block 222 is that the shortest versions of all paths from resource R to every edge switch are stored in the database. The shortest paths are stored for the switch where the path terminates. In the examples paths P1 and P2, both paths start with the switch 'A' and end with the switch 'G'. The last switch (G) is an edge switch, and the first switch (A) is a switch that is directly connected to resource R.

Figure 3:
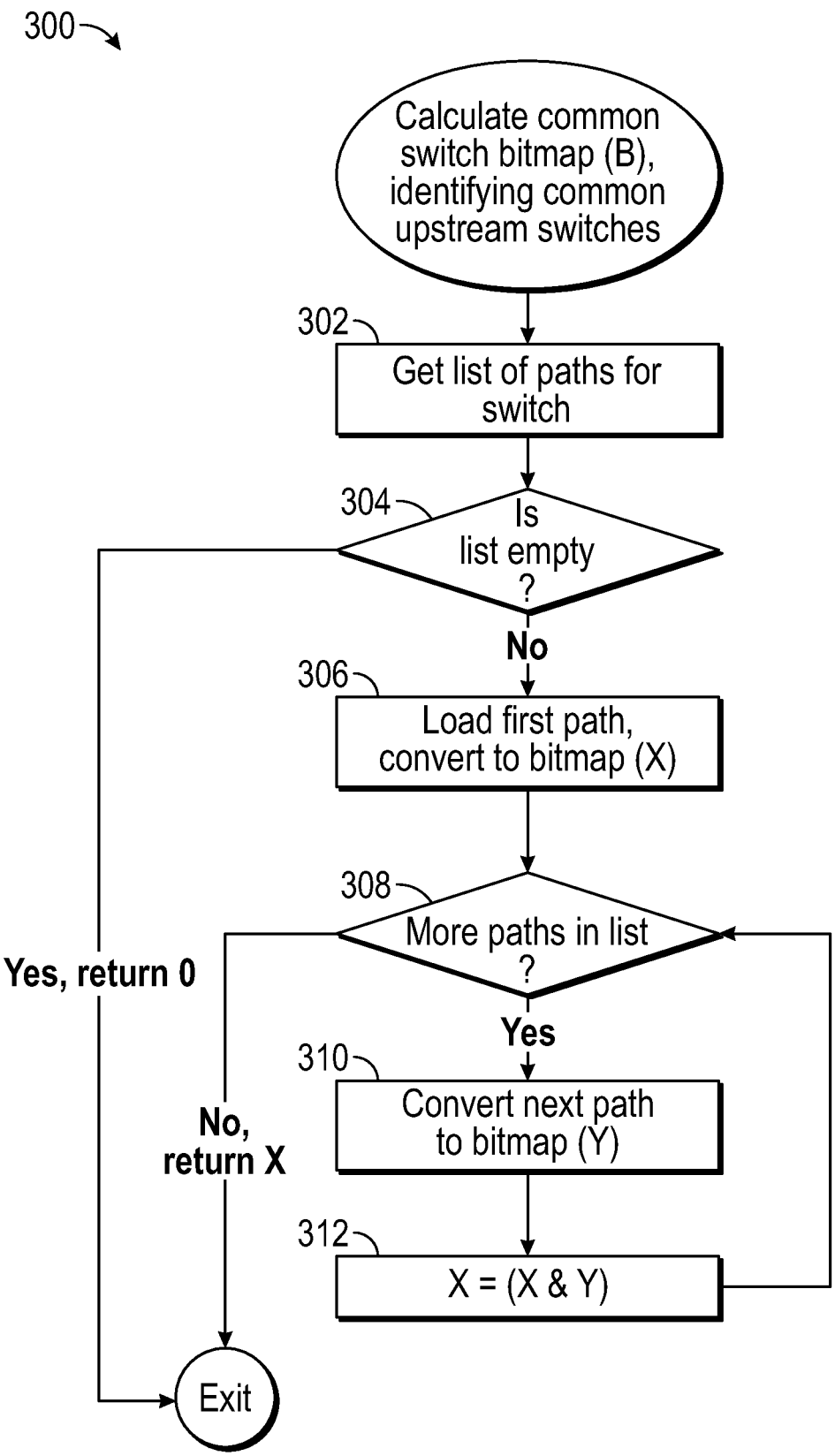
FIG. 3 is a flow diagram illustrating an example process for determining upstream switches common to all paths from a resource node to an edge switch of a network according to certain aspects of the disclosure.

FIG. 3 is a flow diagram illustrating an example process 300 for determining upstream switches common to all paths from a resource node to an edge switch of a network according to certain aspects of the disclosure. The process 300 begins at operation block 302, where a list of stored paths for an edge switch is obtained. At control block 304, if the list is empty, the process is ended. Otherwise, if the list is not empty, at operation block 306, the first path in the list is loaded and converted to a bitmap X. In one or more implementations, rather than storing a path in a non-bitmap form and then converting the path to a bitmap after it is read, the path can be stored in bitmap form, which can make for optimal storage. At control block 308, if there are no more paths in the list the process is ended. Otherwise, at operation block 310, the next path in the list is converted to a bitmap Y. At operation block 312, a bitwise AND (&) operation between bitmaps X and Y is performed, where X is set equal to (X & Y) and the control is passed to the control block 308.

TABLE 2

| Edge Switch | Stored Path(s) |
|---|---|
| A | A-B-E-G |
|   | A-B-C-F-G |
|   | A-B-C-D-G |
| B | B-A-F |
|   | B-C-D-F |
|   | B-G-F |

The result of bitwise 'AND' operation is that the resulting bitmap contains the set of switches common to all paths for the edge switch. For example, consider the case that the database includes stored paths shown in Table 2 for the edge switches A and B. Then the resulting calculation for paths corresponding to the edge switch A would be: 1100101 & 1110011 & 1111001=1100001. Here the bitmaps 1100101, 1110011 and 1111001 respectively represent (based on the switch set of Table 1) the paths A-B-E-G, A-B-C-F-G and A-B-C-D-G for the edge switch A, as shown in table 320. The result 1100001 of the AND operation indicates that the switches common to all paths for A are A, B and G. Similarly, the resulting calculation for paths of the edge switch B of Table 2 would be: 1100010 & 0111010 & 0100011=0100010, where the bitmaps 1100010, 0111010 and 0100011 respectively represent (based on the switch set of Table 1) the paths B-A-F, B-C-D-F and B-G-F for the edge switch B, as shown in Table 2. The result 0100010 of the AND operation indicates that the switches common to all paths for the edge switch B are B and F. The result of the process 300 provides the set of switches that (if they become non-functional) would cause an outage for all end-hosts connected to the given edge switch.

Figure 4A:
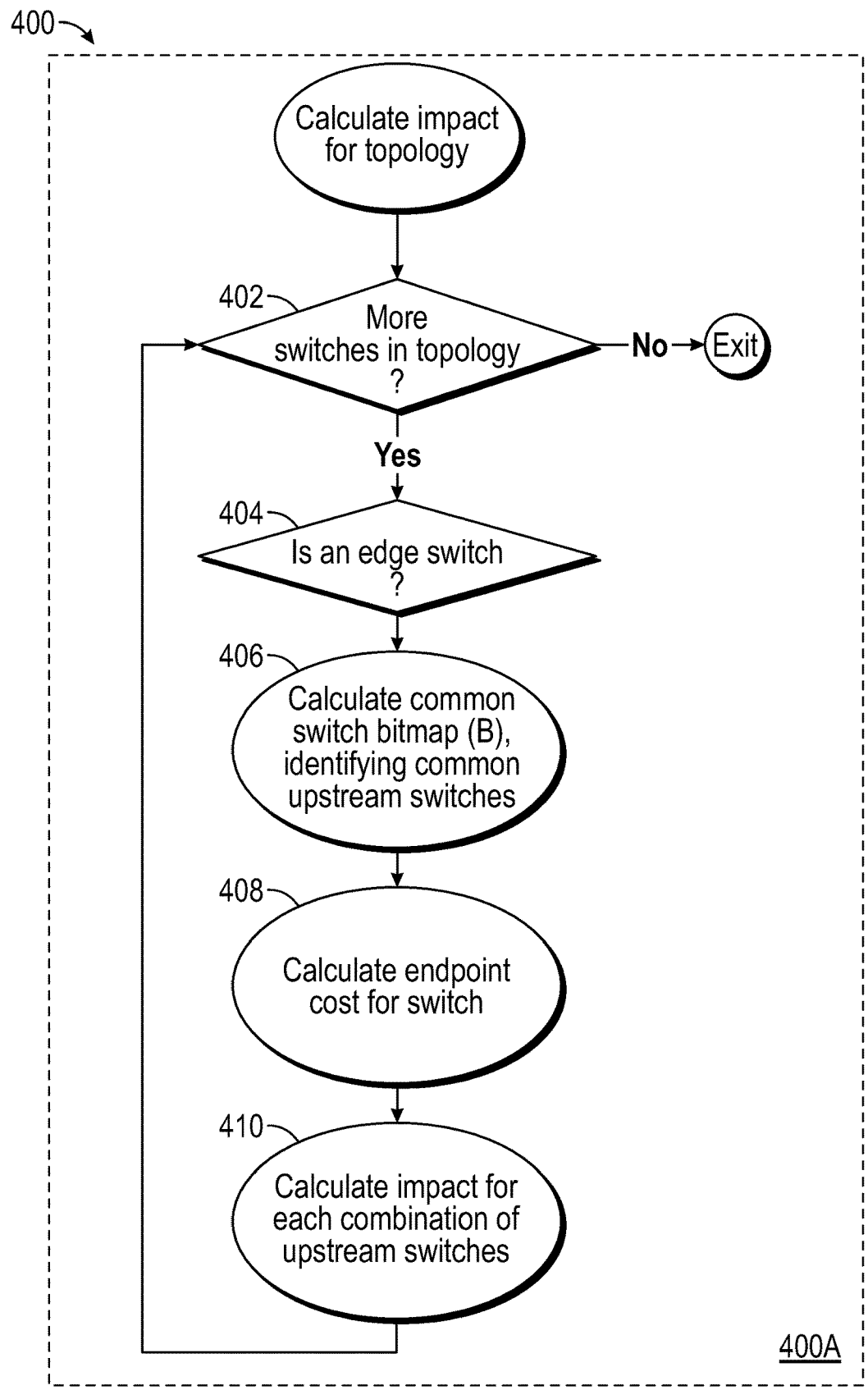
FIGS. 4A through 4C are flow diagrams illustrating an example process for identifying an impact of common upstream switches in the network.
Figure 4B:
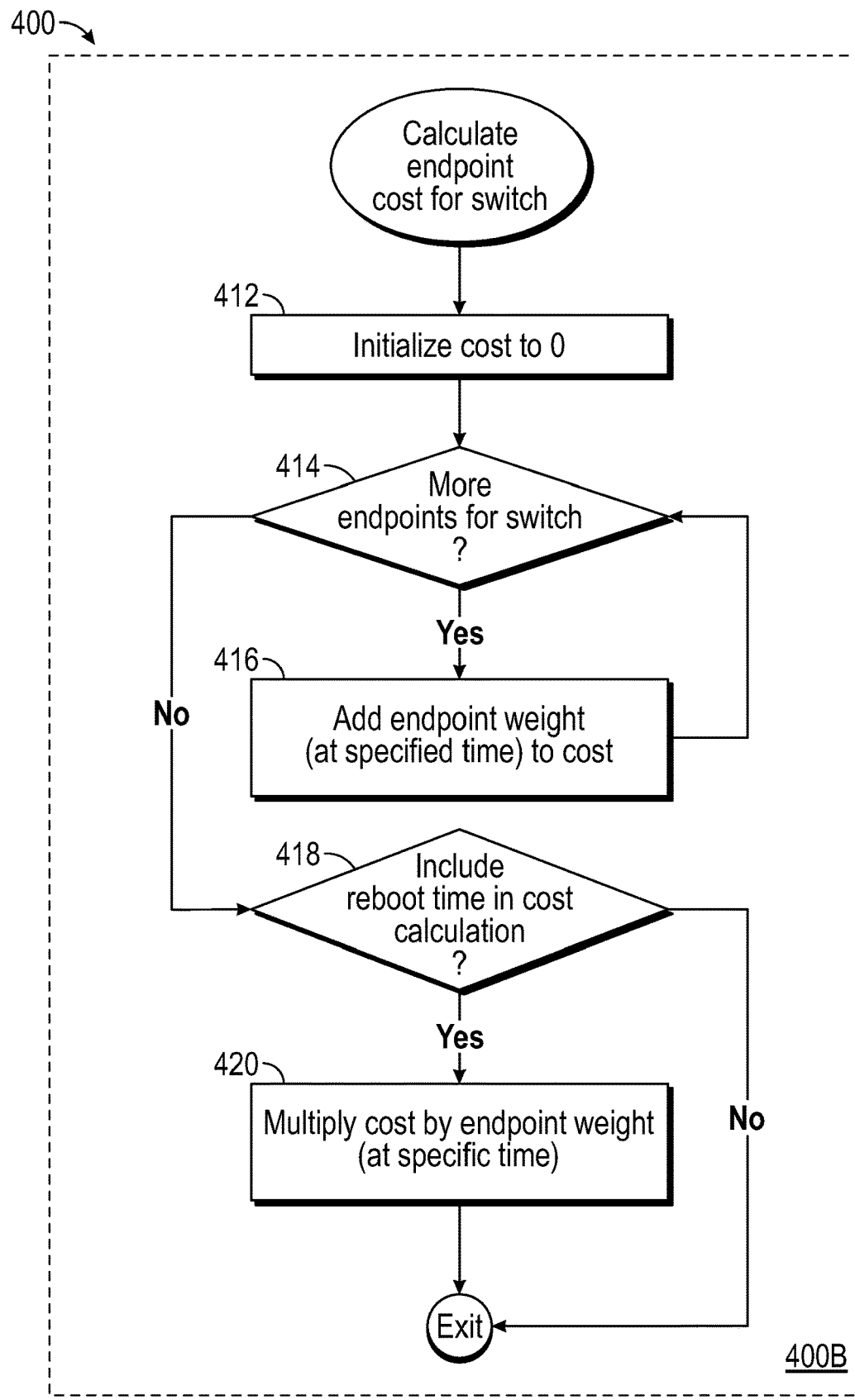
Figure 4C:
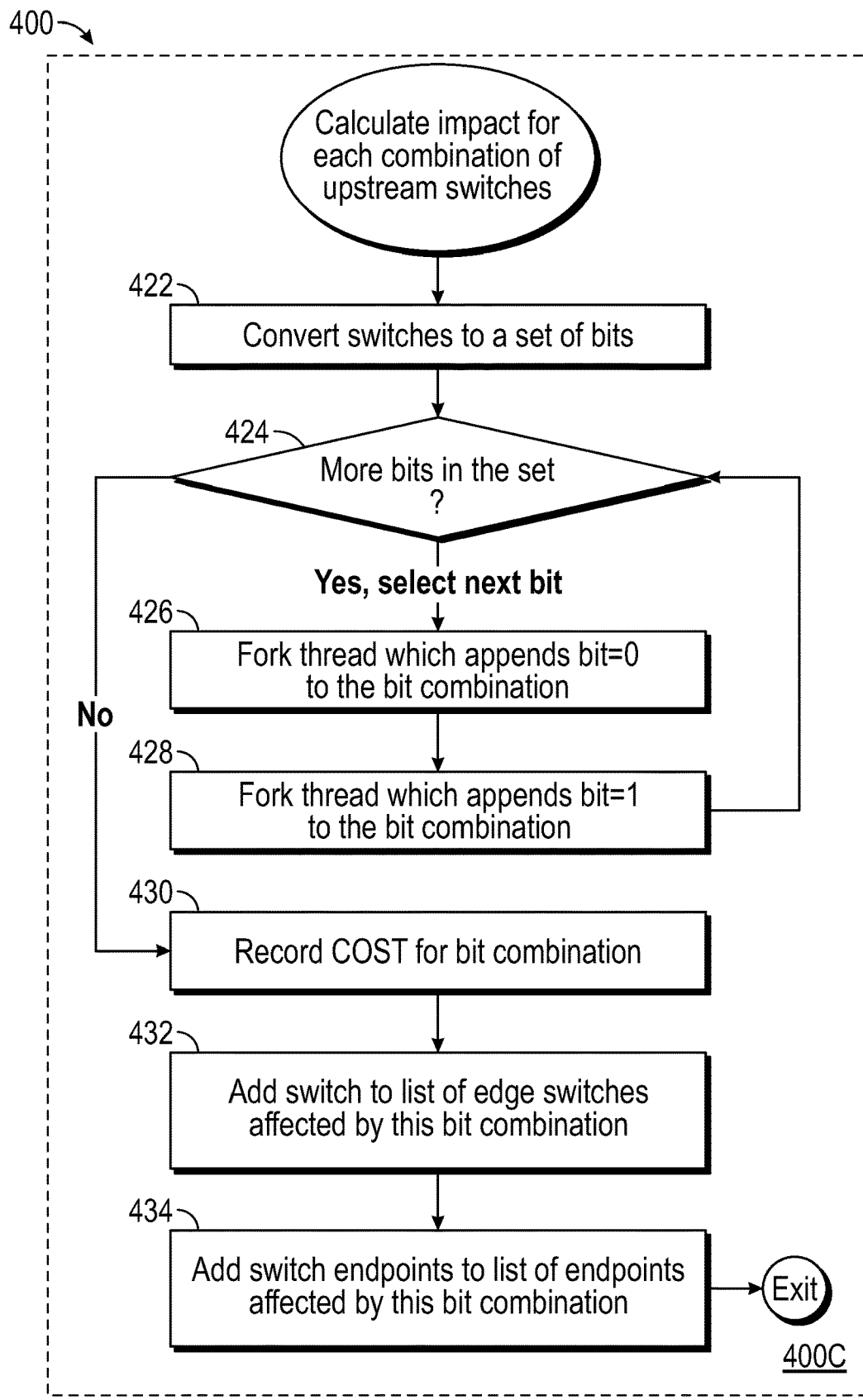

FIGS. 4A through 4C are flow diagrams illustrating an example process 400 for identifying an impact of common upstream switches in the network and corresponding tables according to certain aspects of the disclosure. The process 400 includes process flows 400A, 400B and 400C. For the purpose of the process flows 400A, the impact on a network topology is an endpoint cost for a given switch of a network topology. The endpoint cost calculated by the process flows 400A is a numeric cost for the given switch. The endpoint cost is calculated based on the sum of the weights (e.g., an admin-defined value) of each endpoint device directly connected to the switch. The process flows 400A begins at the control block 402, where it is checked whether there are switches in the network topology. If there is no switch the process flow 400A ends. Otherwise, if there is a switch, at control block 404 it is determined whether the switch is an edge switch. If the switch is an edge switch, at operation block 406, using the process 300 of FIG. 3, a common switch bitmap is calculated. At operation block 408, endpoint cost for the switch is calculated as discussed herein with respect to the process flow 400B. Finally at operation block 410, the impact (cost) for different combinations of upstream switches are calculated, as further discussed herein with respect to process flow 400C, and control is passed to control block 402 to complete the cost calculation for the entire switches of network topology. An example cost calculation will be discussed after the process flows 400B and 400C are described to further clarify the process steps.

In the process flow 400B, the endpoint cost is calculated based on the sum of the weights of each endpoint directly connected to the edge switch, as will be discussed below. This cost is optionally multiplied by the reboot time of that edge switch. The process flow 400B begins at initialization operation block 412, where the cost is initialized to zero. At the next control block 414, it is determined whether there are more endpoints for the edge switch. If there are more endpoints for the edge switch, at operation block 416, the endpoint weight (e.g., at a specified time) is added to the cost. For example, the weight value assigned to a mission-critical server would be significantly higher than the weight assigned to an office printer. In one or more implementations, an endpoint weight value can change over time. For instance, a printer can have a higher weight value during work hours when employees are present, or a backup server can have a higher weight value during off-hours when backups can occur. If the result of the control block 414 is that there are more endpoints for the edge switch, at control block 418 it is checked whether the reboot time is to be considered in the cost calculation. If the reboot time is not to be considered in the cost calculation the process flow 400B ends. Otherwise, at operation block 420, the cost is multiplied by another weight that depends on the reboot time of the edge switch. It is understood that switch reboot times can vary from a few seconds to ~30 minutes. Therefore, the operation block 420 calculates, for example, a 10-minute outage for a given endpoint to be "just as costly" as a 1-minute outage for an endpoint with 10x more importance.

The process flow 400C can calculate impact of each combination of upstream switches. The process flow 400C begins at operation block 422, where the set of switches are converted to a set of bit positions (e.g., represented by a bitmap). At control block 424, it is checked whether there are more bits in the set. If there are more bits in the set, at operation blocks 426 and 428, the set of bits are fork threaded to append bit=0 and bit=1 to the bit combination. The operation blocks 426 and 428 are further explained by the third column of Table 3 discussed below. Otherwise, if there are no more bits in the set, at operation block 430 the cost for the bit combination is recoded. At operation block 432, the switch is added to the list of edge switches affected by the bit combination. And finally the process flow 400C ends after adding switch endpoints to the list of endpoints affected by the bit combination at operation block 434, as described below with respect to Tables 3 and 4.

TABLE 3

| Edge Switch | Common Upstream Switches | Bit Combinations | Switch Combination |
|---|---|---|---|
| A | B, G | x0xxxx0 (B = 0, G = 0) | None |
|   |   | x0xxxx1 (B = 0, G = 1) | G |
|   |   | x1xxxx0 (B = 1, G = 0) | B |
|   |   | x1xxxx1 (B = 1, G = 1) | B, G |
| B | F | xxxxx0x (B = 0, F = 0) | None |
|   |   | xxxxx1x (B = 0, F = 1) | F |

TABLE 4

| Switch Combination | Edge Switches Affected | Endpoints Affected |
|---|---|---|
| G | A | Endpoints on A |
| B | A | Endpoints on A |
| B, G | A | Endpoints on A |
| F | B | Endpoints on B |

In Table 3 the process of fork threading to append bit=0 and bit=1 is shown. For each edge switch (e.g., A or B) the common upstream switches are obtained, using the process 300 of FIG. 3. For example, for the edge switches A and B, the common upstream switches are sets A,B,G and B,F, respectively. The calculated bit combination for the edge switch A was A,B,G (1100001) and for the edge switch B was B,F (0100010). In the next step all possible bit combinations for the switches which are in those sets (excluding the edge switch itself from the calculation, for simplicity here) are listed (see third column of Table 3). The bit combinations of the third column of Table 3 are then converted to switch combinations shown in the fourth column of Table 3. In the recording step, these switch combinations are recorded using the reverse association from the process that generated them, as shown in Table 4, which shows affected edge switches (second column of Table 4) and affected endpoints (third column of Table 4). These results indicate the edge switches and corresponding endpoints that are affected when a given switch combination is rebooted. Similar calculations can be performed for every edge switch in the network, to obtain tables similar to Table 4, which indicates which edge switches and endpoints can be affected by rebooting any single switch or any combination of switches in the network. The process flows 400A, 400B and 400C will be further clarified with examples discussed herein with respect to FIGS. 7 and 8 below.

Figure 5:
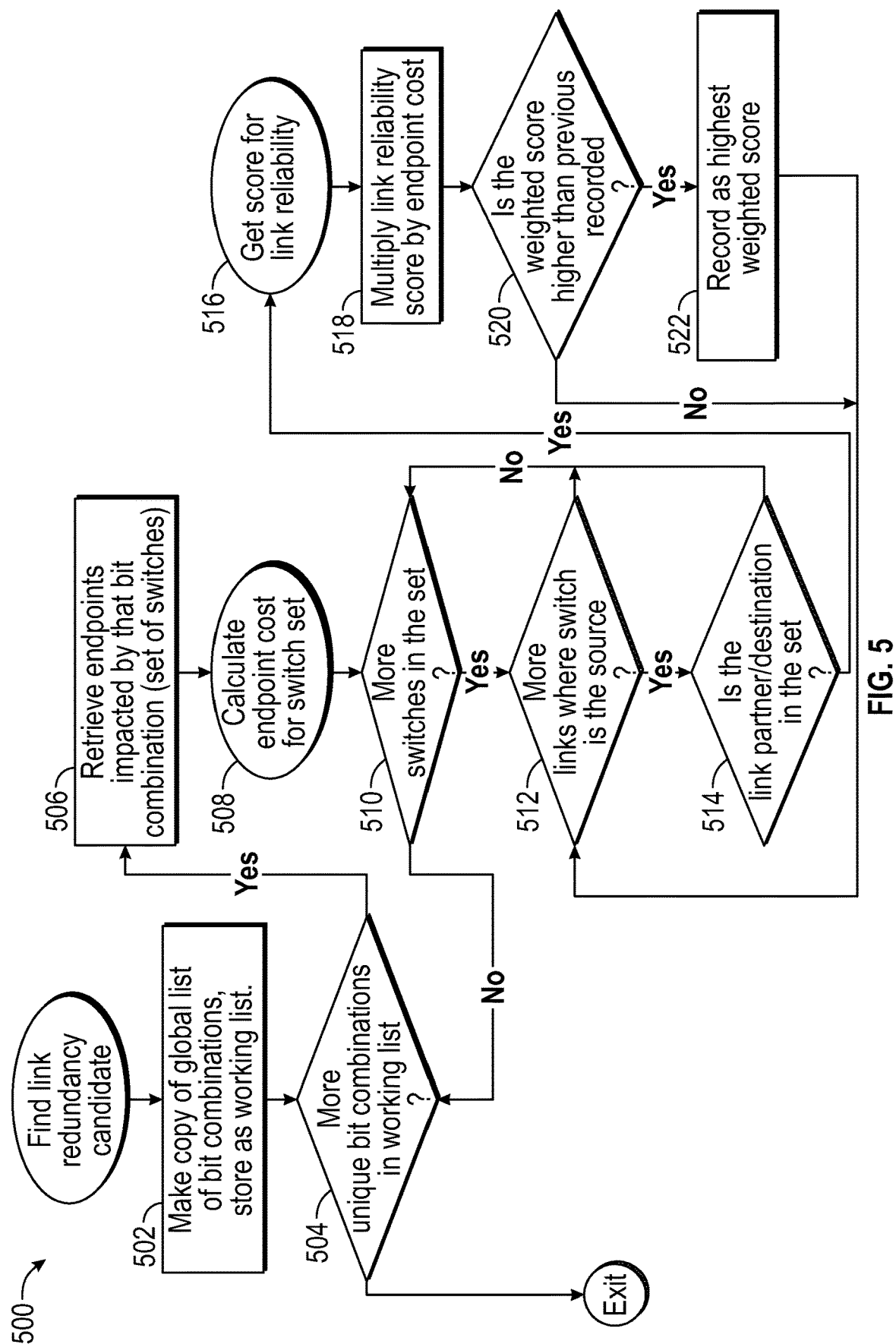
FIG. 5 is a flow diagram illustrating an example process for determining link redundancy candidates of a network according to certain aspects of the disclosure.

FIG. 5 is a flow diagram illustrating an example process 500 for determining link redundancy candidates of a network according to certain aspects of the disclosure. The process 500 uses the switch combination keys of table 450 of FIG. 4B, and looks for link partners in each switch combination, then multiplies the link reliability score (tally) by the endpoint cost for that group. In one or more implementations, the link reliability score can be a floating point with a value between 0 and 1. A link reliability score is high (e.g., 1) if the link is unreliable and is low (e.g., 0) if the link is reliable. This ensures that an unreliable link is more likely to be made redundant than a reliable link. It also ensures that a link which (if down) has a large effect on the network is more likely to be made redundant than a link which has a small effect on the network.

The process 500 begins at operation block 502, where a copy of a global list of bit combinations is copied and stored as a working list. At control block 504, it is checked to see if there are more unique bit combinations in the working list. If there are no more unique bit combinations in the working list, the process 500 ends after returning the link with the highest recorded score. Otherwise, if there are more unique bit combinations in the working list, at operation block 506, the endpoints affected by the bit combination are retrieved, as discussed above. Next, at operation block 508 the endpoint cost for switch sets ate calculated using process flow 400B of FIG. 4. At control block 510, it is checked if there are more switches in the switch set. If there are no more switches in the switch set, control is passed to control block 504. Otherwise, if there are more switches in the switch set, at control block 512 it is determined whether there are more links having the switch as the source. If there are not such links, control is passed to operation block 510. Otherwise, at control block 514, it is checked whether the link partner and/or destination is in the set of switches. If the result is no, the control is passed to control block 510. Otherwise, at operation block 516, scores for the link reliability are obtained (e.g., from a network admin). Next, at operation block 518, the obtained link reliability scores are multiplied by the endpoint cost calculated at the operation block 508 to obtain a weighted score. At control block 520, it is determined whether the weighted score is higher than previously recorded weighted scores. If the weighted score is higher than previously recorded weighted scores, at operation block 522, the weighted score is recorded as the highest weighted score. Otherwise, the control is passed to control block 512.

Figure 6A:
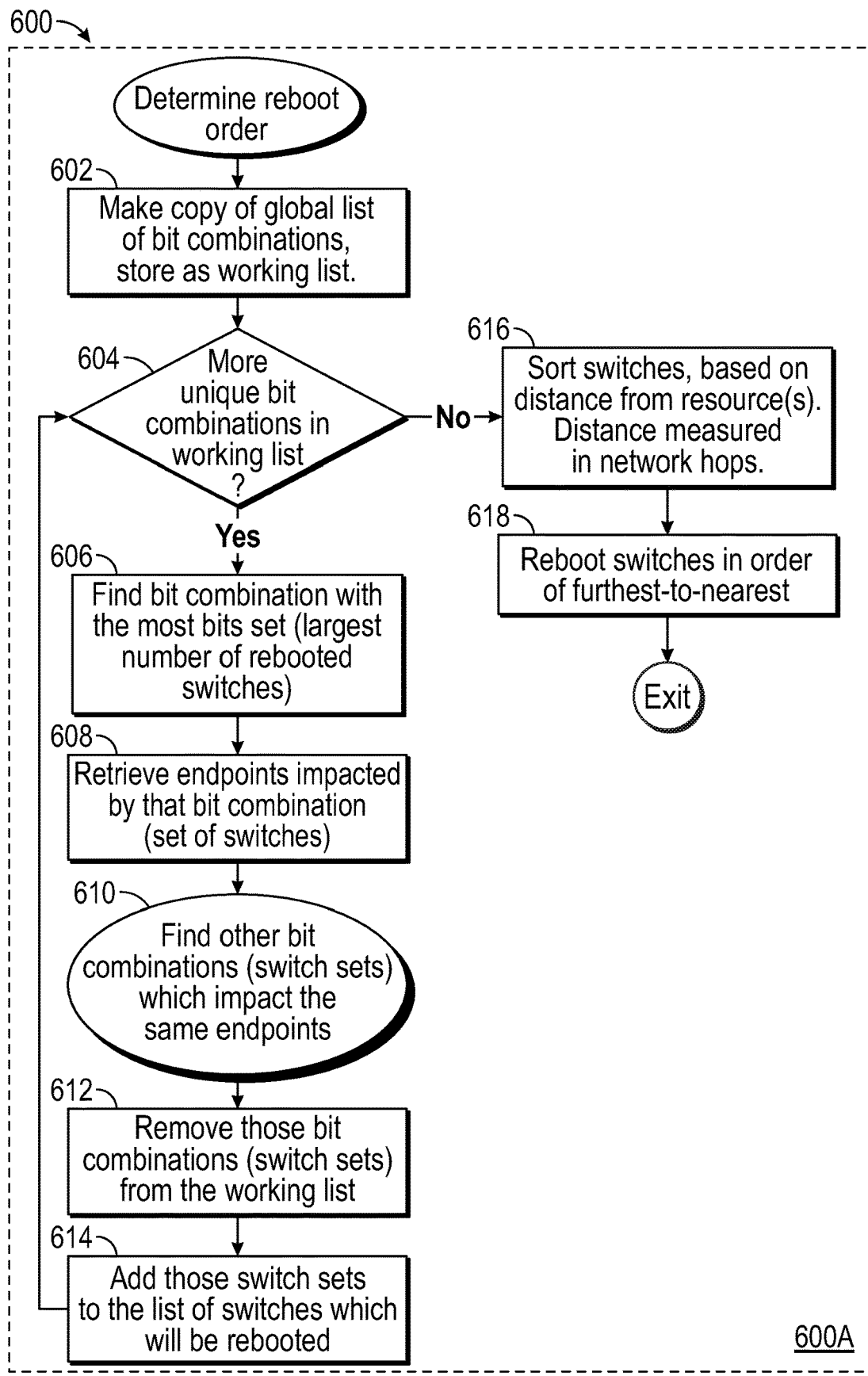
FIGS. 6A-6B are flow diagrams illustrating an example process for determining a rebooting order of switches of a network according to certain aspects of the disclosure.
Figure 6B:
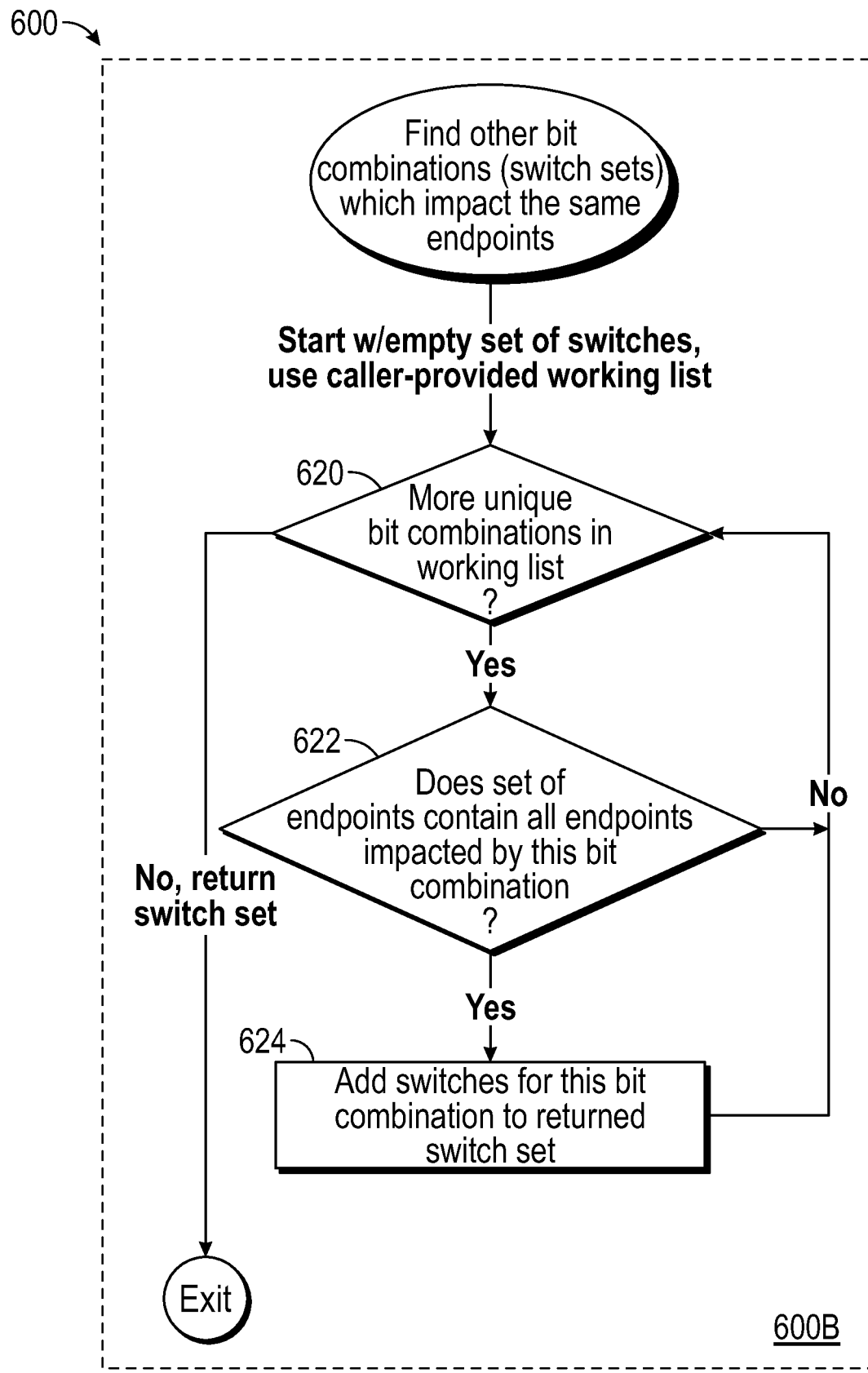

FIGS. 6A-6B are flow diagrams illustrating an example process 600 for determining a rebooting order of switches of a network according to certain aspects of the disclosure. The example process 600 includes process flows 600A and 600B discussed below. The process flow 600A uses the switch combination keys from table 440 of FIG. 4B. The process flow 600A aims at finding sets of switches which can be rebooted together in order to minimize network downtime. The process flow 600A determines a set of switches which all impact the same set of endpoints. The process flow 600A then orders these switches (based on distance from the resource R), so that the switches can be rebooted in series even if no isolated management network exists. The switches are rebooted in the order specified, from furthest to nearest.

The process flow 600A begins at operation block 602, where a copy of a global list of bit combinations is made and is used as a working list. At control block 604, it is checked whether more unique combinations exist in the working list. If there are no more unique combinations in the working list, at operation block 616, switches are sorted based on distance from resource(s). The distance is measured in terms of network hops. Next, at operation block 618, the switches are rebooted in order of farthest-to nearest distance and the process flow 600A end. Otherwise, if at control block 604 it is determined that more unique combinations exit in the working list, control is passed to operation block 606. At operation block 606, a bit combination with the most bits set (e.g., with the largest number of rebooted switches) is found. At some implementations, only a subset of switches can be considered. For instance, there may be five switches in a path/set, but only three of the switches need to be rebooted. In that case, switches which don't need to be rebooted would be omitted by this process flow 600A. At operation block 608, the endpoints affected by the bit combination (switch sets) are retrieved. Next, at operation block 610 other bit combinations (switch sets) that can affect the same endpoints are found using the process flow 600B discussed below. Next, at operation block 612, those bit combinations (switch sets) are removed from the working list. Finally, at operation block 614, those switch sets are added to the list of switches which are to be rebooted.

The process flow 600B is a helper for the process flow 600A. Given a set of switches (e.g., G from table 440 of FIG. 4B), the process flow 600B finds other sets of switches which impact the same set of endpoints (e.g., B and B,G from table 440). For example, consider the case where all switches in the network need to be rebooted for maintenance. If rebooting switch G will cause an outage for endpoints on A, then the system may as well simultaneously reboot other switches which would cause an outage for the endpoints on the edge switch A. In the example of table 440, if switch G is to be rebooted, then the edge switch B can be rebooted at the same time, because then the reboots are performed in parallel, instead of in series. The total downtime for the edge switch A becomes max (reboot_time (B), reboot_time (G)) rather than (reboot_time (B)+reboot_time (G)).

The process flow 600B begins at control block 620, where it is checked whether there are more unique bit combinations in the working list. If there are no more unique bit combinations in the working list, the process flow 600B ends. Otherwise, if there are more unique bit combinations in the working list, at control block 622, it is checked whether the set of endpoints contains all endpoints affected by this bit combination. If the result is no, control is passed to control block 620. Otherwise, if the set of endpoints contains all endpoints affected by the bit combination, at operation block 624, the switches for the bit combination are added to the retuned switch set and control is passed to control block 620.

Figure 7:
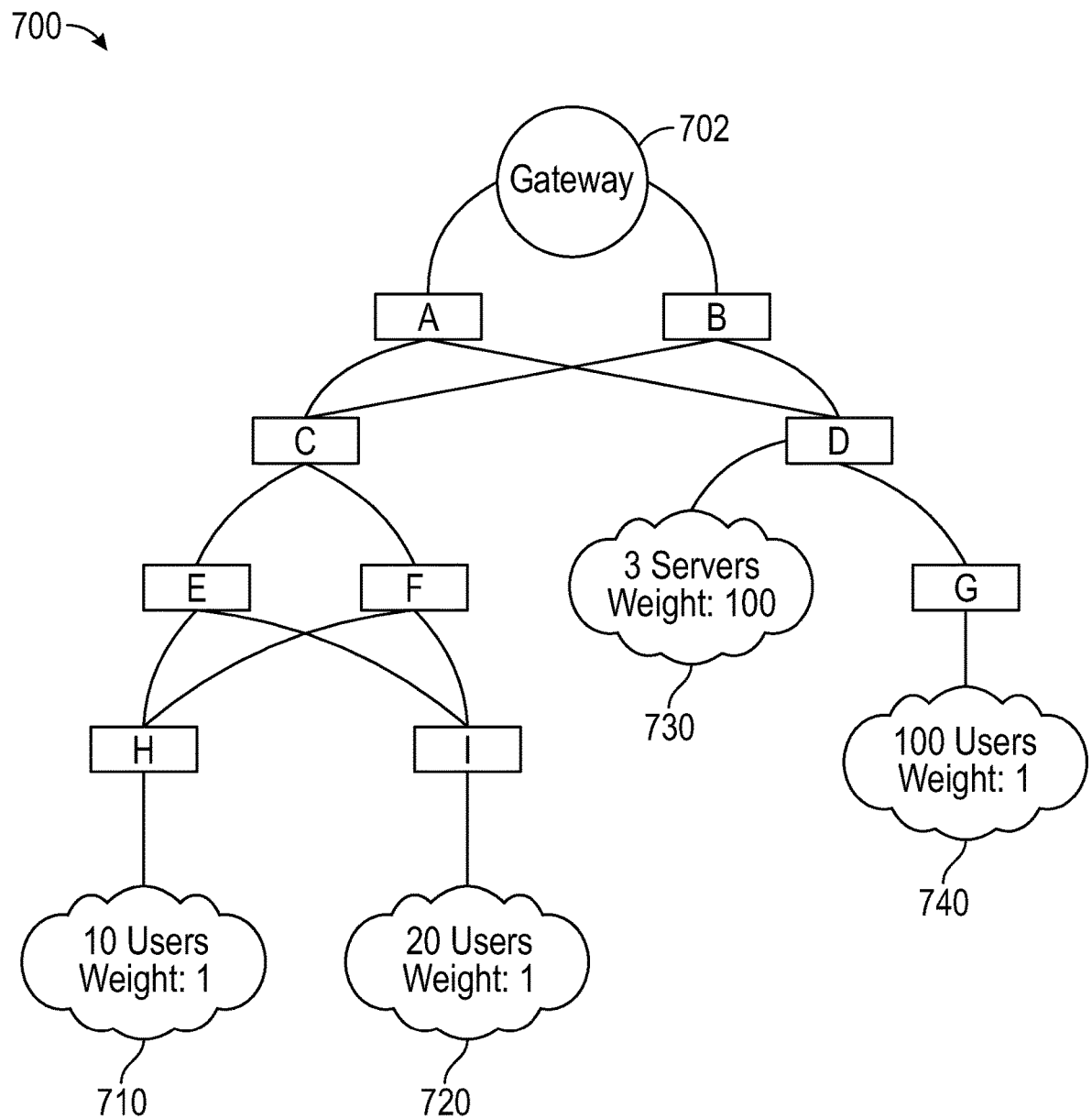
FIG. 7 is a block diagram illustrating an example network for implementing the processes of the subject technology according to certain aspects of the disclosure.

FIG. 7 is a block diagram illustrating an example network 700 for implementing the processes of the subject technology according to certain aspects of the disclosure. The network 700 includes gateway 702, which is a resource for end users coupled to the network, and a number of switches (e.g., A, B, C, D, E, F, G, H and I). The end-point groups 710, 720, 730 and 740 are directly connected to edge switches H, I, D and G, respectively. Each of the end-point groups 710, 720, 730 and 740 are coupled to the gateway 702 via one or more paths. The end-point groups 710, 720, 730 and 740 have different weights based on their type and the number of users, as shown in FIG. 7. For example, the end-point group 710 has 10 users with a weight of 1, the end-point group 720 has 20 users with a weight of 1, the end-point group 730 has 3 servers with a weight of 100 and the end-point group 740 has 100 users with a weight of 1. Further discussion on the implementation of the processes of the subject technology will follow with respect to Tables 5-7 shown below.

TABLE 5

10 users: (ACEH, ACFH, BCEH, BCFH)
20 users: (ACEI, ACFI, BCEI, BCFI)
3 servers: (AD, BD)
100 users: ADG, BDG Tables 5 through 7 illustrate results of implementing the processes of the subject technology on the network 700 of FIG. 7 according to certain aspects of the disclosure. For the data provided in the Tables 5 through 7, the processes of the subject technology are run at L1 layer. Table 5 shows different paths for different end-point groups 710 (10 users), 720 (20 users), 730 (3 servers) and 740 (100 users) of FIG. 7. These paths can be determined by using the process flow 200A of FIG. 2.

Table 6 shows the corresponding upstream switches common to all paths for the sets of endpoints shown in Table 5. For example, for the end-point group 710 (10 users), the determined paths are A-C-E-H, A-F-C-H, B-C-E-H and B-C-F-H. The common switches for these paths can be calculated, based on the process 300 discussed above, to be C, H, which is indicated in Table 6. Other entries of the Table 6 can be calculated similarly. When the administrator decides to upgrade switch C, the endpoints in the end-point groups 710 (10 users) and 720 (20 users) would need to be notified (e.g., based on Table 6).

TABLE 6

10 users: C, H
20 users: C, I
3 servers: D
100 users: D, G

TABLE 7

C, H: 10 total (average 5 per switch)
C, I: 20 total (average 10 per switch)
C: 30 total (average 30 per switch)
D: 400 total (average 400 per switch)
D, G: 100 total (average 50 per switch)
G: 100 total (average 100 per switch)

Table 7 shows weighted downtime cost for each non-redundant switch (set). The entries for Table 7 can be calculated based on the process 400 discussed above. For example, for the switch C, because it is common to both the end-point groups 710 (10 users) and 720 (20 users), the weighted downtime cost is 30 total (10*1+20*1=30). Similarly, for the switch D, which is common to both end-point groups 730 (3 servers) and 740 (100 users), weighted downtime cost is 400 total (3×100+100×1=400). Based on weighted costs in table 830, the switch recommended for redundancy would be switch D, because the calculated switch value (400) for switch D is higher than any other switch in table 830. Considering equal reliability (tally=1) for all links, the set of links with the potential for redundancy would be D-G with a total cost of 100. Based on this data, the recommendation would be to make the D-G link redundant to provide added protection for the group of 100 users connected to switch G.

Figure 8:
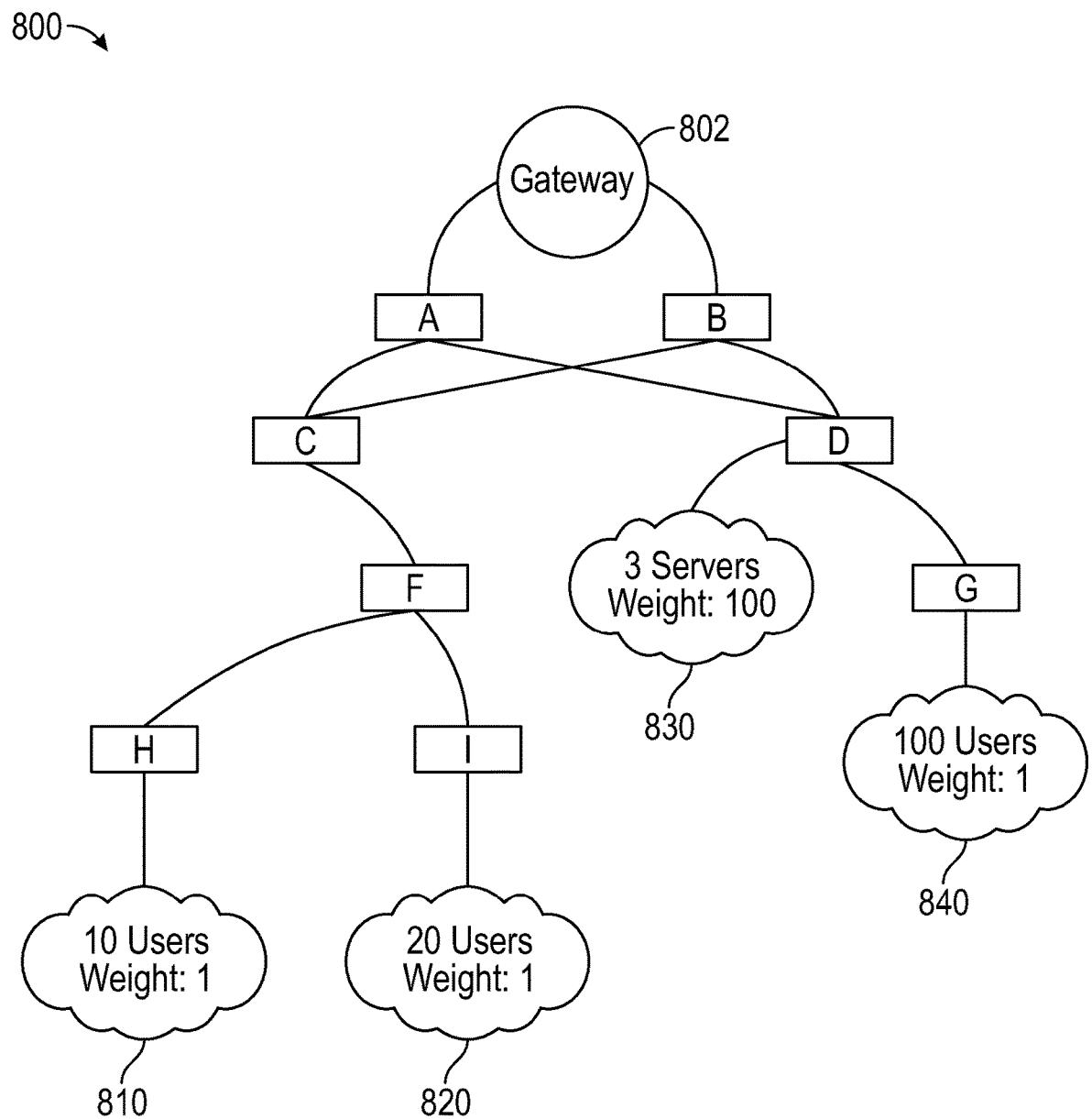
FIG. 8 is a block diagram illustrating an example network for implementing the processes of the subject technology according to certain aspects of the disclosure.

FIG. 8 is a block diagram illustrating an example network 800 for implementing the processes of the subject technology according to certain aspects of the disclosure. The network 800 is similar to the network 700 of FIG. 7, except for the switch E of the network 700, which is not present in the network 800. Further, the network 700 is an L1 topology, whereas the network 800 is an L2 topology. The discussion of the L2 topology 800 here is to indicate that the same algorithms of the subject technology can produce different results when implemented in L1 and L2. The network 800 includes a gateway 802, which is a resource for end users coupled to the network, and a number of switches (e.g., A, B, C, D, F, G, H and I). The end-point groups 810, 820, 830 and 840 are directly connected to edge switches H, I, D and G, respectively. Each of the end-point groups 810, 820, 830 and 840 are coupled to the gateway 802 via one or more paths. The end-point groups 810, 820, 830 and 840 have different weights based on their type and the number of users, as shown in FIG. 8. For example, the end-point group 810 has 10 users with a weight of 1, the end-point group 820 has 20 users with a weight of 1, the end-point group 830 has 3 servers with a weight of 100 and the end-point group 840 has 100 users with a weight of 1. Further discussion on the implementation of the processes of the subject technology will follow with respect to Table 8 below Table 8 illustrates results of implementing the processes of the subject technology on the networks 700 and 800 of FIGS. 7 and 8 according to certain aspects of the disclosure. For the data provided in FIG. 10, the processes of the subject technology for the network 700 are performed at the network layer L1, and for the network 800 at the network layer L2. Table 8 includes results for the networks 700 and 800. The depicted results indicate that the paths for the end-point groups 810 (10 users) and 820 (20 users) (L2 topology) would differ from the results for the end-point groups 710 (10 users) and 720 (20 users) (L1 topology). The L2 topology (network 800) is missing paths through switch E, therefore switch E is identified as having the potential to be reconfigured for greater L2 redundancy.

TABLE 8

| L1 Topology | L2 Topology |
| --- | --- |
| 10 users: (ACEH, ACFH, BCEH, BCFH) | 10 users: (ACFH, BCFH) |
| 20 users: (ACEI, ACFI, BCEI, BCFI) | 20 users: (ACFI, BCFI) |

Figure 9:
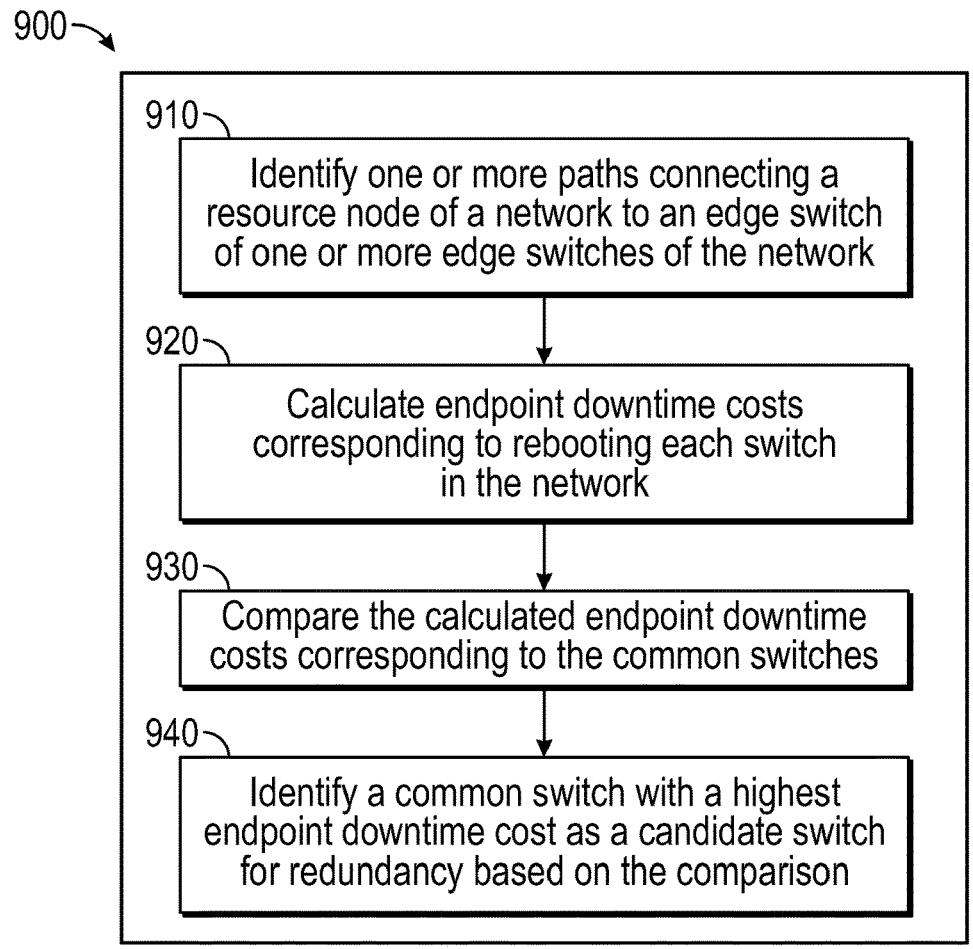
FIG. 9 is a flow diagram illustrating an example method for minimizing a network outage according to certain aspects of the disclosure.

FIG. 9 is a flow diagram illustrating an example method 900 for minimizing a network outage (e.g., 100A of FIG. 1A or 700 of FIG. 7) according to certain aspects of the disclosure. The method 900 includes identifying one or more paths connecting a resource node (e.g., 102 of FIG. 1A or 702 of FIG. 7) of the network to an edge switch (e.g., SW2 of FIG. 1A or H of FIG. 7) of one or more edge switches of the network (1110). Each edge switch can be connected to one or more endpoint devices (e.g., $EPD_k$ of FIG. 1A or 710 of FIG. 7) to allow resources coupled to the resource node to be provided to the one or more endpoint devices. The method further includes calculating endpoint downtime costs (e.g., 830 of FIG. 8) corresponding to rebooting each of the common switches in the network (1120). The common switches (e.g., 820 of FIG. 8) are present in all paths connecting the resource node to the edge switch (e.g., 810 of FIG. 8). The calculated endpoint downtime costs corresponding to the one or more common switches are compared (1130). One of the common switches with a highest endpoint downtime cost (e.g., D of table 830 of FIG. 8) is identified as a candidate switch for redundancy based on the comparison (1140).

Hardware Overview

Figure 10:
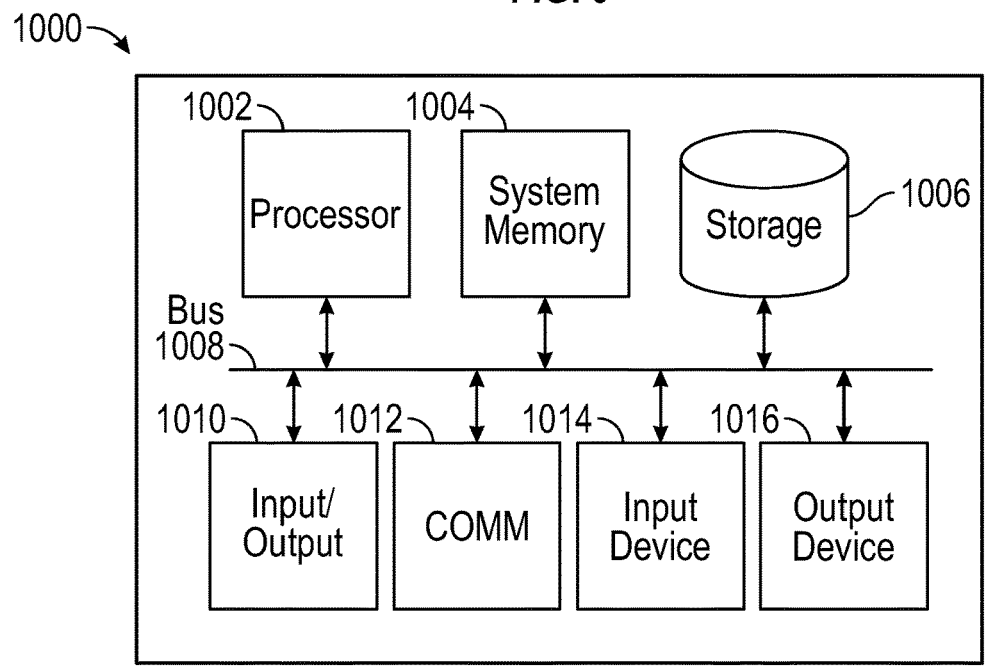
FIG. 10 is a block diagram illustrating an example computer system with which the processes of the subject technology can be implemented.

FIG. 10 is a block diagram illustrating an example computer system with which the processes of the subject technology can be implemented. In some aspects, the computer system 1000 may represent a server, a desktop, a laptop computer or a tablet that can be used to implement processes of the subject technology as discussed above with respect to FIGS. 2, 3, 4A, 5 and 6. In certain aspects, the computer system 1000 may be implemented using hardware or a combination of software and hardware, either in a dedicated server, or integrated into another entity, or distributed across multiple entities.

Computer system 1000 includes a bus 1008 or other communication mechanism for communicating information, and a processor 1002 coupled with bus 1008 for processing information. According to one aspect, the computer system 1000 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 1000 may be implemented with one or more processors 1002. Processor 1002 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, special purpose logic circuitry. Expansion memory may also be provided and connected to computer system 1000 through input/output module 1010, which may include, for example, a SIMM (Single In Line Memory Module) card interface. Such expansion memory may provide extra storage space for computer system 1000, or may also store applications or other information for computer system 1000. Specifically, expansion memory may include instructions to carry out or supplement the processes described above, and may include secure information also. Thus, for example, expansion memory may be provided as a security module for computer system 1000, and may be programmed with instructions that permit secure use of computer system 1000. In addition, secure applications may be provided via the SIMM cards, along with additional information, such as placing identifying information on the SIMM card in a non-hackable manner.

The instructions may be stored in the memory 1004 and implemented in one or more computer program products, i.e., one or more modules of computer program instructions encoded on a computer readable medium for execution by, or to control the operation of, the computer system 1000, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multi-paradigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions. Computer system 1000 may be coupled via input/output module 1010 to various devices. The input/output module 1010 can be any input/output module. Example input/output modules 1010 include data ports such as USB ports. In addition, input/output module 1010 may be provided in communication with processor 1002, so as to enable near area communication of computer system 1000 with other devices. The input/output module 1010 may provide, for example, for wired communication in some implementations, or for wireless communication in other implementations, and multiple interfaces may also be used. The input/output module 1010 is configured to connect to a communications module 1012. Example communications modules 1012 may include networking interface cards, such as Ethernet cards and modems.

The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 1012 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, near-field communications (NFC), or other such transceiver.

In any such implementation, communications module 1012 sends and receives electrical, electromagnetic or optical signals that carry digital data streams representing various types of information. The network link typically provides data communication through one or more networks to other data devices. For example, the network link of the communications module 1012 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through communications module 1012, which carry the digital data to and from computer system 1000, are example forms of transmission media.

Computer system 1000 can send messages and receive data, including program code, through the network(s), the network link and communications module 1012. In the Internet example, a server might transmit a requested code for an application program through Internet, the ISP, the local network and communications module 1012. The received code may be executed by processor 1002 as it is received, and/or stored in data storage 1006 for later execution.

In certain aspects, the input/output module 1010 is configured to connect to a plurality of devices, such as an input device 1014 and/or an output device 1016. Example input devices 1014 include a keyboard and a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 1016 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 1016 may comprise appropriate circuitry for driving the output device 1016 to present graphical and other information to a user.

According to one aspect of the present disclosure, the processor 1002 may execute one or more sequences of one or more instructions contained in memory 1004. Such instructions may be read into memory 1004 from another machine-readable medium, such as data storage device 1006. Execution of the sequences of instructions contained in main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

Computing system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, a desktop computer, laptop computer, or tablet computer. Computer system 1000 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 1002 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 1006. Volatile media include dynamic memory, such as memory 1004. Transmission media include coaxial cables, copper wire, and fiber optics, including the wires that comprise bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 1008. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method for minimizing a network outage, the method comprising:
    identifying one or more paths connecting a resource node of the network to an edge switch of one or more edge switches of the network, wherein each edge switch is connected to one or more endpoint devices to allow resources coupled to the resource node to be provided to the one or more endpoint devices;
    converting each of the identified one or more paths to a corresponding order-independent bitmap by assigning an index to each switch of that identified path to indicate a position of a corresponding predetermined bit in the corresponding order-independent bitmap;
    storing the corresponding order-independent bitmap in a database;
    determining one or more common switches that are common between the one or more paths connecting the resource node to the edge switch by:
        performing AND operations between stored order-independent bitmaps corresponding to the one or more paths connecting the resource node to the edge switch to obtain a resulting bitmap; and
        identifying the one or more common switches by determining positions of corresponding predetermined bits in the resulting bitmap;
    calculating endpoint downtime costs corresponding to rebooting each switch of the one or more common switches in the network, wherein the one or more common switches are present in the one or more paths connecting the resource node to the edge switch;
    comparing the calculated endpoint downtime costs corresponding to the one or more common switches; and
    identifying a switch of the one or more common switches with a highest endpoint downtime cost as a candidate switch for redundancy based on the comparison of the calculated endpoint downtime costs.

2. The method of claim 1, further comprising determining an impact related to a combination of the one or more common switches, wherein the impact indicates edge switches that are affected by rebooting the combination of the one or more common switches.

3. The method of claim 2, further comprising determining a combination of the one or more common switches affecting an edge switch by:
    excluding the edge switch from a list of the combination of the one or more common switches;

calculating possible bit combinations for remaining switches of the combination of the one or more common switches; and identifying switch combinations associated with the calculated possible bit combinations, wherein the identified switch combinations are the determined combination of the one or more common switches affecting the edge switch.

4. The method of claim 3, further comprising, when rebooting a switch of the determined combination of the one or more common switches affecting the edge switch, rebooting, in parallel, one or more other switches of the determined combination of the one or more common switches affecting the edge switch.

5. The method of claim 3, wherein calculating the endpoint downtime costs corresponding to rebooting each switch of one or more common switches is based on a reboot time of that switch and a summation of one or more weights, wherein each weight of the one or more weights is associated with an endpoint device affected by the determined combination of the one or more common switches.

6. The method of claim 1, further comprising identifying a candidate link for redundancy based on a link reliability scored based on a recent history of malfunctions associated with a link, wherein the candidate link connects the candidate switch for redundancy identified among one or more common switches to another switch of the one or more common switches.

7. The method of claim 1, further comprising determining a reboot order among a set of switches to be rebooted together in order to minimize the downtime of the network by:

determining a first set of switches of the set of switches capable of affecting a set of endpoint devices; and ordering the first set of switches based on respective distances from the resource node from a furthest distance switch to a nearest distance switch, wherein the reboot order among the set of switches is from the furthest distance switch to the nearest distance switch.

8. A system for minimizing a network outage, the system comprising:

a memory comprising instructions; and a processor configured to execute the instructions to:

identify one or more paths connecting a resource node of the network to an edge switch of one or more edge switches of the network, wherein each edge switch is connected to one or more endpoint devices to allow resources coupled to the resource node to be provided to the one or more endpoint devices;

determine one or more common switches among the one or more identified paths connecting the resource node of the network to the edge switch of the one or more edge switches of the network;

calculate endpoint downtime costs corresponding to rebooting each switch of one or more determined common switches;

compare the calculated endpoint downtime costs corresponding to the one or more common switches;

identify a candidate switch for redundancy by determining based on the comparison of the calculated endpoint downtime costs, a switch of one or more common switches as having a highest endpoint downtime cost as the candidate switch for redundancy;

determine a combination of the one or more common switches affecting the edge switch by:

excluding the edge switch from a list of the combination of the one or more common switches;

calculating possible bit combinations for remaining switches of the combination of the one or more common switches; and identifying switch combinations associated with the calculated possible bit combinations as the determined combination of the one or more common switches affecting the edge switch;

determine an impact of the combination of the one or more common switches by identifying edge switches that are affected by rebooting the combination of the one or more common switches.

9. The system of claim 8, wherein the processor is further configured to:

convert each path of one or more paths to a corresponding order-independent bitmap by assigning an index to each switch of that path to indicate a position of a corresponding predetermined bit in the corresponding order-independent bitmap, and store the corresponding order-independent bitmap in a database.

10. The system of claim 9, wherein the processor is further configured to determine the one or more common switches that are common between the one or more paths connecting the resource node to the edge switch by:

performing AND operations between stored order-independent bitmaps corresponding to the one or more paths connecting the resource node to the edge switch to obtain a resulting bitmap, and identifying the one or more common switches by determining positions of corresponding predetermined bits in the resulting bitmap.

11. The system of claim 8, wherein the processor is further configured to reboot, in parallel, one or more other switches of the determined combination of the one or more common switches affecting the edge switch, when rebooting a switch of the determined combination of the one or more common switches affecting the edge switch.

12. The system of claim 8, wherein the processor is further configured to calculate the endpoint downtime costs corresponding to rebooting each switch of one or more common switches based on a reboot time of that switch and a summation of one or more weights, wherein each weight of the one or more weights is associated with an endpoint device affected by the determined combination of the one or more common switches.

13. The system of claim 8, wherein the processor is further configured to identify a candidate link for redundancy based on a link reliability scored based on a recent history of malfunctions associated with a link, wherein the candidate link connects the candidate switch for redundancy identified among one or more common switches to another switch of the one or more common switches.

14. The system of claim 8, wherein the processor is further configured to determine a reboot order among a set of switches to be rebooted together in order to minimize the downtime of the network by:

determining a first set of switches of the set of switches capable of affecting a set of endpoint devices; and ordering the first set of switches based on respective distances from the resource node from a furthest distance switch to a nearest distance switch, wherein the reboot order among the set of switches is from the furthest distance switch to the nearest distance switch.

15. A non-transitory machine-readable storage medium comprising machine-readable instructions for causing a processor to execute a method for minimizing a network outage comprising:

identifying one or more paths connecting a resource node of the network to an edge switch of one or more edge switches of the network wherein each edge switch is connected to one or more endpoint devices to allow resources coupled to the resource node being provided to the one or more endpoint devices;

converting each of the identified one or more paths to a corresponding order-independent bitmap by assigning an index to each switch of that identified path to indicate a position of a corresponding predetermined bit in the corresponding order-independent bitmap;

storing the corresponding order-independent bitmap in a database;

determining one or more common switches that are common between the one or more paths connecting the resource node to the edge switch by:

performing AND operations between stored order-independent bitmaps corresponding to the one or more paths connecting the resource node to the edge switch to obtain a resulting bitmap; and identifying the one or more common switches by determining positions of corresponding predetermined bits in the resulting bitmap;

calculating endpoint downtime costs corresponding to rebooting each switch of the one or more common switches, wherein the one or more common switches are present in the one or more paths connecting the resource node to the edge switch;

comparing the calculated endpoint downtime costs corresponding to the one or more common switches; and identifying a switch of one or more common switches with a highest endpoint downtime cost as a candidate switch for redundancy based on the comparison of the calculated endpoint downtime costs.

16. The non-transitory machine-readable storage medium of claim 15, wherein the machine-readable instructions further cause the processor to execute the method for minimizing a network outage comprising:

determining a combination of the one or more common switches affecting an edge switch;

calculating the endpoint downtime costs corresponding to rebooting each switch of one or more common switches based on a reboot time of that switch and a summation of one or more weights, wherein each weight of the one or more weights is associated with an endpoint device affected by the determined combination of the one or more common switches; and determining a reboot order among a set of switches to be rebooted together in order to minimize the downtime of the network by:

determining a first set of switches of the set of switches capable of affecting a set of endpoint devices; and ordering the first set of switches based on respective distances from the resource node from a furthest distance switch to a nearest distance switch, wherein the reboot order among the set of switches is from the furthest distance switch to the nearest distance switch.

17. The non-transitory machine-readable storage medium of claim 15, wherein the machine-readable instructions further cause the processor to execute the method for minimizing a network outage comprising:

determining an impact related to the combination of the one or more common switches, wherein the impact indicates edge switches that are affected by rebooting the combination of the one or more common switches.

18. The non-transitory machine-readable storage medium of claim 17, wherein the machine-readable instructions further cause the processor to execute the method for minimizing a network outage comprising:

excluding the edge switch from a list of the combination of the one or more common switches;

calculating possible bit combinations for remaining switches of the combination of the one or more common switches; and identifying switch combinations associated with the calculated possible bit combinations, wherein the identified switch combinations are the determined combination of the one or more common switches affecting the edge switch.

19. The non-transitory machine-readable storage medium of claim 18, wherein the machine-readable instructions further cause the processor to execute the method for minimizing a network outage comprising: when rebooting a switch of the determined combination of the one or more common switches affecting the edge switch, rebooting, in parallel, one or more other switches of the determined combination of the one or more common switches affecting the edge switch.

20. The non-transitory machine-readable storage medium of claim 18, wherein calculating the endpoint downtime costs corresponding to rebooting each switch of one or more common switches is based on a reboot time of that switch and a summation of one or more weights, wherein each weight of the one or more weights is associated with an endpoint device affected by the determined combination of the one or more common switches.

* * * * *